United States Patent
Arrao et al.

(10) Patent No.: US 9,825,500 B2
(45) Date of Patent: Nov. 21, 2017

(54) PLANAR-ENDED RIPPLE SPRING AND HARDENED STATOR BAR ARMOR

(71) Applicant: General Electric Company, Schenectady, NY (US)

(72) Inventors: Anthony Salvatore Arrao, Clifton Park, NY (US); James Jun Xu, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 319 days.

(21) Appl. No.: 14/630,870

(22) Filed: Feb. 25, 2015

(65) Prior Publication Data

US 2016/0065023 A1    Mar. 3, 2016

Related U.S. Application Data

(60) Provisional application No. 62/043,187, filed on Aug. 28, 2014.

(51) Int. Cl.
*H02K 3/30* (2006.01)
*F16F 1/18* (2006.01)

(52) U.S. Cl.
CPC ............ *H02K 3/30* (2013.01); *F16F 1/185* (2013.01)

(58) Field of Classification Search
CPC .................................. F16F 1/185; H02K 3/30
USPC ........................................................ 310/201
See application file for complete search history.

(56) References Cited

U.S. PATENT DOCUMENTS

| | | | |
|---|---|---|---|
| 3,158,770 A | 11/1964 | Coggeshall et al. | |
| 3,909,931 A | 10/1975 | Lambrecth | |
| 4,048,530 A * | 9/1977 | Kaufman, Jr. | H02K 5/04 310/43 |
| 4,468,504 A | 8/1984 | Kuemmel | |
| 4,469,971 A * | 9/1984 | Moore | H02K 3/487 29/596 |
| 4,584,497 A * | 4/1986 | Butman, Jr. | H02K 3/48 310/214 |
| 5,325,008 A * | 6/1994 | Grant | H02K 3/48 174/DIG. 19 |
| 5,381,498 A * | 1/1995 | Bylander | G02B 6/3805 385/83 |
| 5,708,315 A | 1/1998 | Gould et al. | |
| 5,822,845 A | 10/1998 | Gould et al. | |
| 6,124,659 A | 9/2000 | Rowe et al. | |
| 6,218,759 B1 * | 4/2001 | Blakelock | H02K 3/505 310/260 |
| 6,580,192 B2 | 6/2003 | Murayama et al. | |
| 6,790,901 B2 * | 9/2004 | Kawaguchi | C03C 25/36 523/400 |
| 7,418,858 B2 | 9/2008 | Fischer et al. | |
| 7,852,105 B2 | 12/2010 | Seeley et al. | |
| 8,400,042 B2 | 3/2013 | Xu et al. | |

(Continued)

FOREIGN PATENT DOCUMENTS

EP    1408599 A2    4/2004
JP    59136039 A    8/1984

*Primary Examiner* — Alex W Mok
(74) *Attorney, Agent, or Firm* — Ernest G. Cusick; Hoffman Warnick LLC

(57) ABSTRACT

A ripple spring includes a body including a central portion having a substantially sinusoidal shaped surface and a substantially planar end portion extending from each end of the central portion. A stator bar may include an armor layer including a novalac epoxy resin impregnated glass composite.

18 Claims, 9 Drawing Sheets

(56) References Cited

U.S. PATENT DOCUMENTS

| | | | |
|---|---|---|---|
| 8,736,276 B2 | 5/2014 | Stonehouse et al. | |
| 2004/0012135 A1* | 1/2004 | Abergel | B05B 11/048 |
| | | | 267/166 |
| 2005/0284241 A1 | 12/2005 | Swartout et al. | |
| 2012/0319525 A1* | 12/2012 | Xu | H02K 3/487 |
| | | | 310/214 |
| 2012/0319698 A1* | 12/2012 | Stonehouse | H02K 3/487 |
| | | | 324/537 |
| 2013/0168973 A1* | 7/2013 | Xu | F01K 23/04 |
| | | | 290/1 R |
| 2013/0300248 A1* | 11/2013 | Ishida | H02K 3/345 |
| | | | 310/214 |
| 2014/0082944 A1 | 3/2014 | Ali et al. | |

* cited by examiner

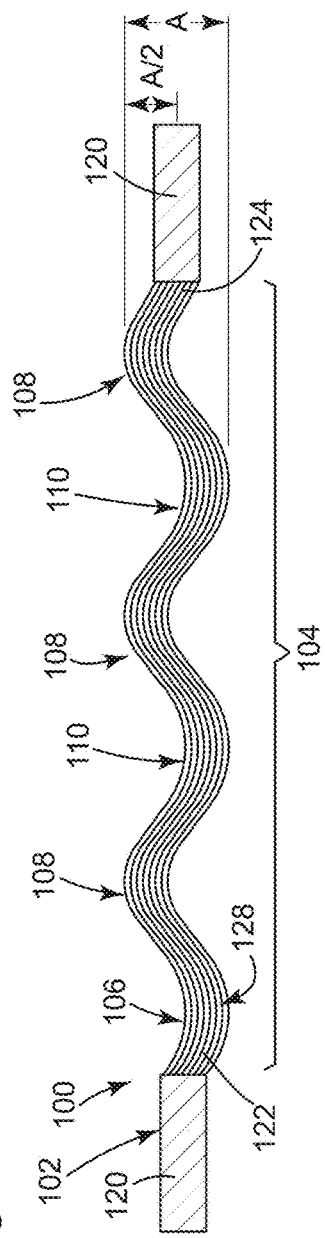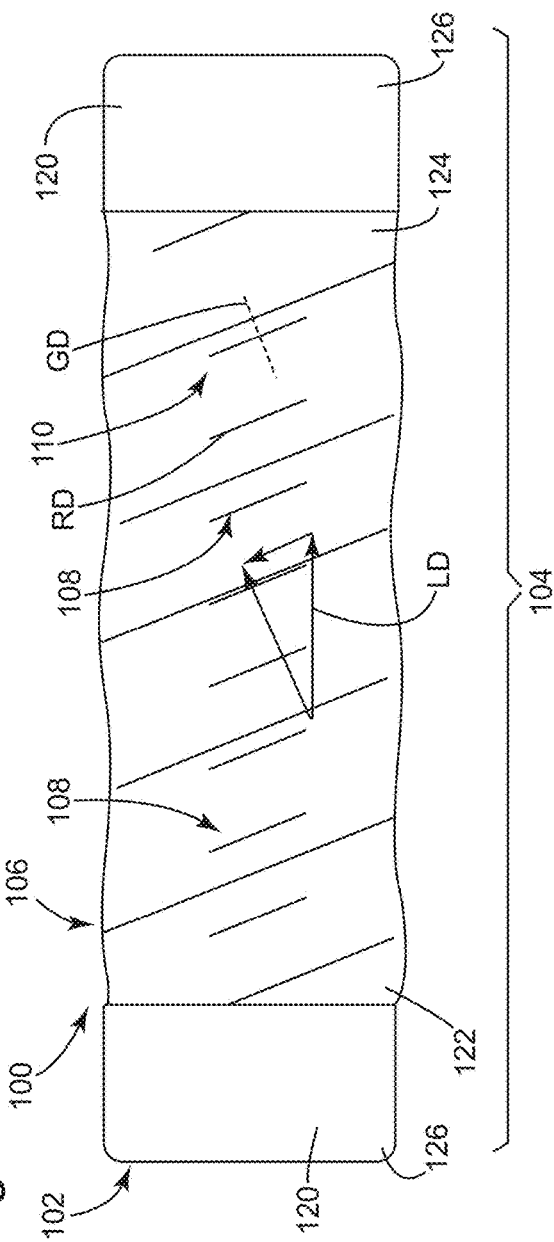

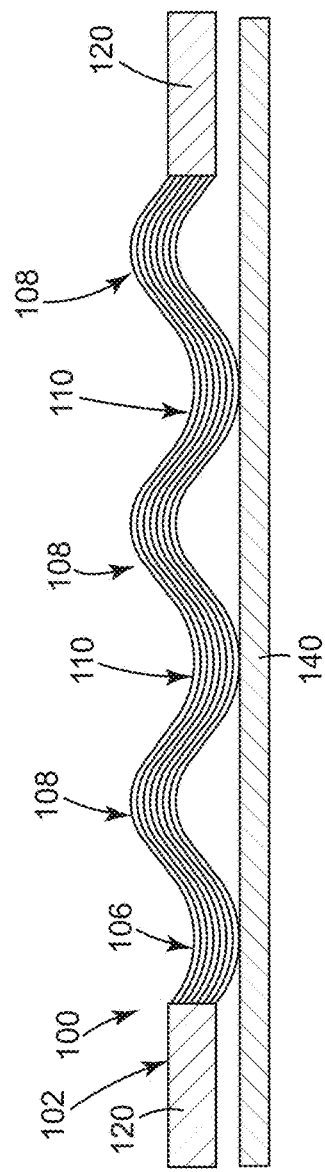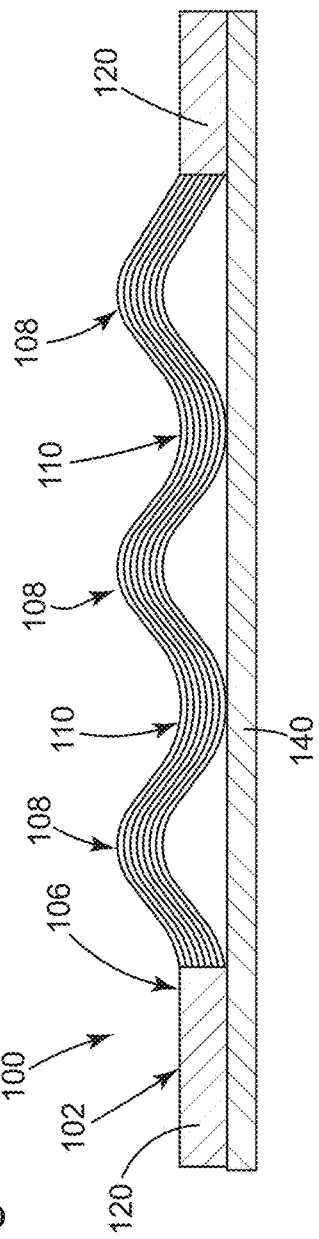

PLANAR-ENDED RIPPLE SPRING AND HARDENED STATOR BAR ARMOR

CROSS-REFERENCE TO RELATED APPLICATIONS

This application claims priority to currently U.S. Patent Provisional Application No. 62/043,187 filed on Aug. 28, 2014. The application identified above is incorporated herein by reference in its entirety for all that it contains in order to provide continuity of disclosure.

BACKGROUND OF THE INVENTION

The disclosure relates generally to stators, and more particularly, to a ripple spring having substantially planar end portions to reduce the tendency of abrasion-induced stator winding damage, and a stator bar with a heat resistant and hardened armor layer.

Armature windings, also known as stator bars or windings, are routinely inspected in electrical power generators to verify their operation during scheduled outage. In some generators, a stator yoke in the generator surrounds an armature core and partially encloses the armature windings. The stator windings are formed from a plurality of copper conductors that are wound in the armature to form circuit loops. The armature windings may be arranged within a stator slot in such a manner that the generator may maintain desired voltage, current and service longevity characteristics during operation.

The stator windings of an electric generator are typically under multiple stresses such as electromagnetic and mechanical forces, electric field, chemical and thermal stresses. The mechanical stress imposed on the surface of a stator bar may be laterally, radially and axially applied. Those lateral and radial movements of the bar in the slot are typically restrained with a retention system including ripple springs that induce a radial or circumferential retaining force to the stator to facilitate reducing movement of the stator bar windings within the stator slot.

The modern winding retention system that dampens the lateral movement of a stator winding may employ thousands of ripple springs. The ripple springs that are placed along the stator bars and between the stator core and the bars are called side ripple springs. They are typically compressed approximately 70-90%. A conventional single ripple spring includes ripple waves to absorb the vibration displacement of a stator winding within the ripple amplitude. The forces imposed on the stator bar are relatively high near the end of the slot. Consequently, when a ripple spring wears, the lateral forces of the stator bar may increase the abrasion-related damage to both the spring and armored stator bar surfaces. The phenomenon may reduce the service longevity of a designed stator winding, causing an unscheduled outage, and potentially resulting in a down-time cost. Another abrasion problem may occur when an uneven ripple finish at the edge or end of a side ripple spring wears against the armored glass layer of the stator bar. In this case, the reduced ground wall insulation thickness may increase the frequency and need for repairs or replacement. The stator winding surfaces may also be worn by the ridge of the ripple spring.

BRIEF DESCRIPTION OF THE INVENTION

A first aspect of the disclosure provides a ripple spring comprising: a body including a central portion having a substantially sinusoidal shaped surface and a substantially planar end portion extending from each end of the central portion.

A second aspect is directed to a stator bar comprising: a stator bar core; a semiconductive layer disposed about the stator bar core; an insulator layer disposed about the semiconductive layer; and an armor layer disposed at least partially about the insulator layer, the armor layer including a novalac epoxy resin impregnated glass composite.

A third aspect of the disclosure provides a stator bar comprising: a stator bar core; a semiconductive layer disposed about the stator bar core; an insulator layer disposed about the semiconductive layer; and an armor layer disposed at least partially about the insulator layer, the armor layer including flexible ceramic substantially U-shaped tubing that is configured to conform to a surface of the insulator layer.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 4 shows a cross-sectional view of a ripple spring according to embodiments of the invention.

FIGS. 5 and 6 show plan views of a ripple spring according to embodiments of the invention.

FIG. 15 shows a cross-sectional view of a sacrificial wear plate for use with a ripple spring according to embodiments of the invention.

FIG. 16 shows a cross-sectional view of an alternative embodiment of the sacrificial wear plate of FIG. 15.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
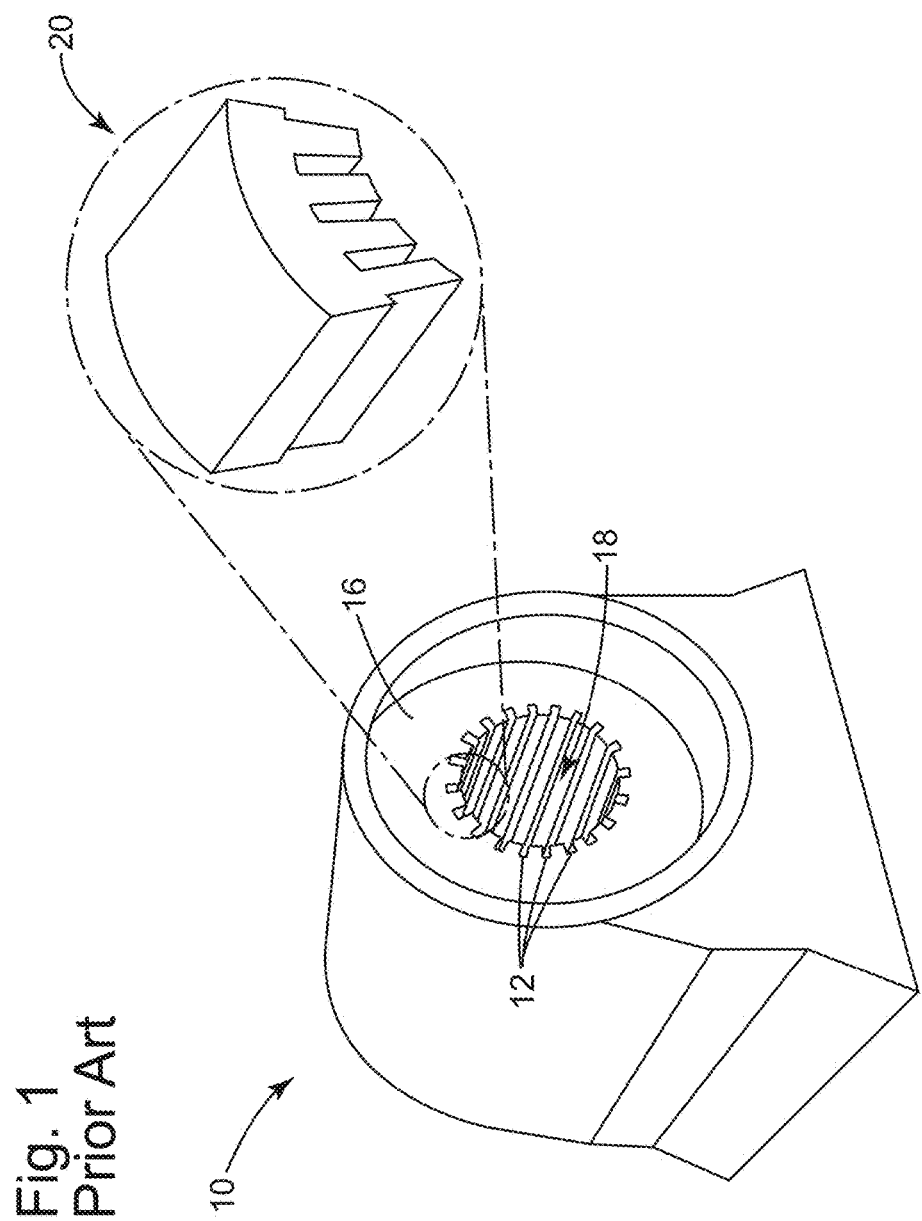
FIG. 1 shows a perspective end view of a conventional electric machine.

FIG. 1 is a perspective end view of an electric machine 10. Electric machine 10 includes a core 16 having a plurality of stator slots 12 to accommodate a winding to generate an electro-magnetic flux. Stator slots 12 are configured to accommodate stator windings to be positioned in the stator slots defined around an inner circumference of core 16 (also referred to as the stator core). The stator windings may be formed from a plurality of flat bar conductors or stator bars that are coupled together to form a predetermined winding path. In one aspect of the invention, the stator bars are fabricated from roebelling the rectangular copper strand package. A rotor (not shown) may be disposed within an opening 18 in stator core 16 where an air or coolant gap is defined between the rotor and stator core 16. A partial, exploded view of the stator is illustrated by reference numeral 20 that is described in detail with reference to FIG. 2. Electrical machine 10 may be any electrical rotating machine or dynamoelectric machine, including but not limited to a motor or generator.

Figure 2:
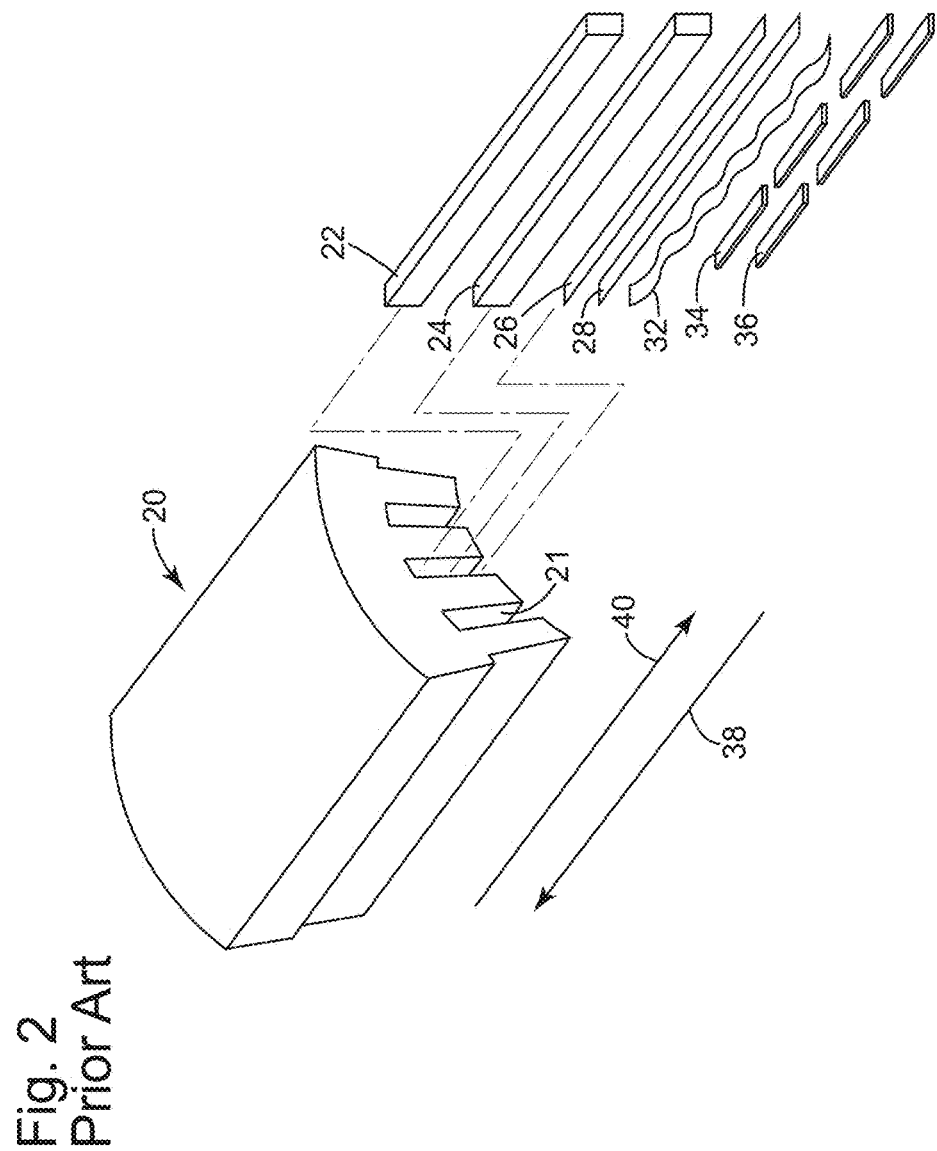
FIG. 2 shows a partial exploded view of a portion of an electric machine stator core and slots shown in FIG. 1.

FIG. 2 illustrates a partial exploded view of a portion of electric machine 10 of FIG. 1. In one aspect of the invention, stator 20 includes a bottom stator bar 22, a top stator bar 24, and one or more slot fillers 26, 28 are positioned at least partially within each stator slot 21. The wedge or retaining system includes a retention device or ripple spring 32. In one aspect of the invention, the retention device includes a ripple spring 32 that is positioned at least partially within stator slot 21 such that the ripple spring 32 is adjacent at to at least one of slot filler 26 or slot filler 28. Ripple spring 32 is then secured in stator slot 21 using a plurality of stator wedge slides 34 and stator wedges 36. For example, moving stator wedge slides 34 in a first direction, indicated by arrow 38, and with respect to stator wedges 36, or moving stator wedges 36 in a second direction, indicated by arrow 40, with respect to stator wedge slides 34, induces restraining pressure to inner (bottom) stator bar 22 and top stator bar 24 to facilitate securing inner (bottom) stator bar 22 and outer (top) stator bar 24 within stator slot 21. Ripple spring 32 may also be placed on the side of stator bars 22, 24 when made with added semiconductive property and enlarged dimension, in which case, they may be referred to as a side ripple spring.

Figure 3:
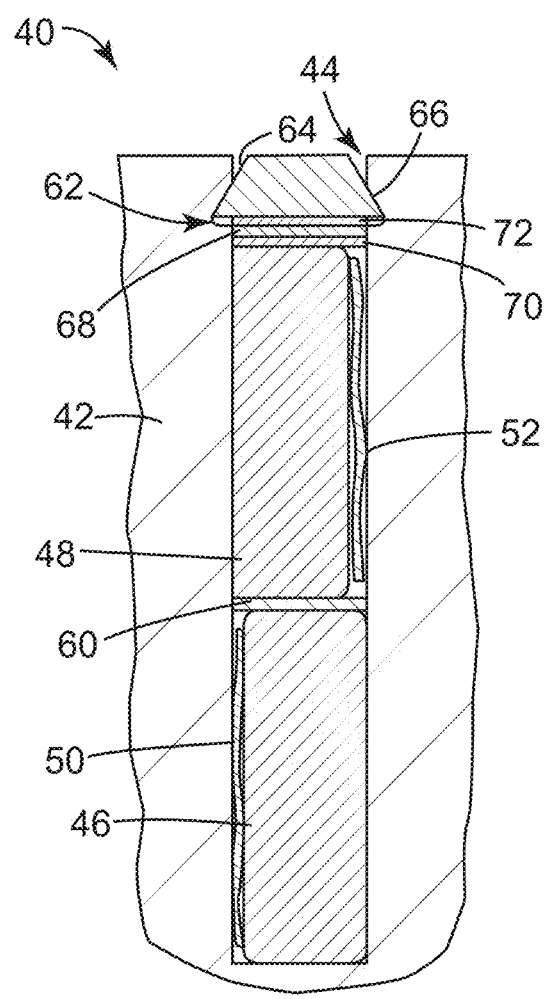
FIG. 3 shows a partial cross-sectional view of a slot in a stator of an electric machine.

FIG. 3 illustrates a cross-sectional view of a conventional stator slot. Stator 40 may include a stator core 42 and is part of a dynamoelectric machine or electric machine, such as a motor or a generator. Stator core 42 includes a plurality of radially extending stator slots 44 for housing stator bars 46 and 48. As will be appreciated, stator core 42 extends around a central axis and the stator slots 44, as well as the stator bars 46 and 48, extend longitudinally parallel to that axis and in a generally radially inward direction. In the illustrated form, side ripple springs 50 and 52 maintain stator bars 46, 48 firmly against the opposite sides of stator slot 44. Side ripple springs 50 and 52 may also be replaced with one of ripple springs 100 (FIGS. 4-7) described in more detail hereinafter. Radial space in stator slots 44 may be taken up by radial fillers 60. A top retention assembly 62 includes stator wedges 64 that extend longitudinally along a radially inner portion of the stator slots 44 with their lateral edges residing in shaped grooves or dovetails 66 formed in stator slots 44, and a top ripple spring 68 positioned at least partially within stator slot 44 such that top ripple spring 68 is adjacent to at least one slot filler 70. Top ripple spring 68 is then secured in stator slot 44 using a plurality of stator wedge slides 72 and stator wedges 64. Top ripple spring 68 may also be replaced with one of ripple springs 100 described in more detail hereinafter.

Figure 6:
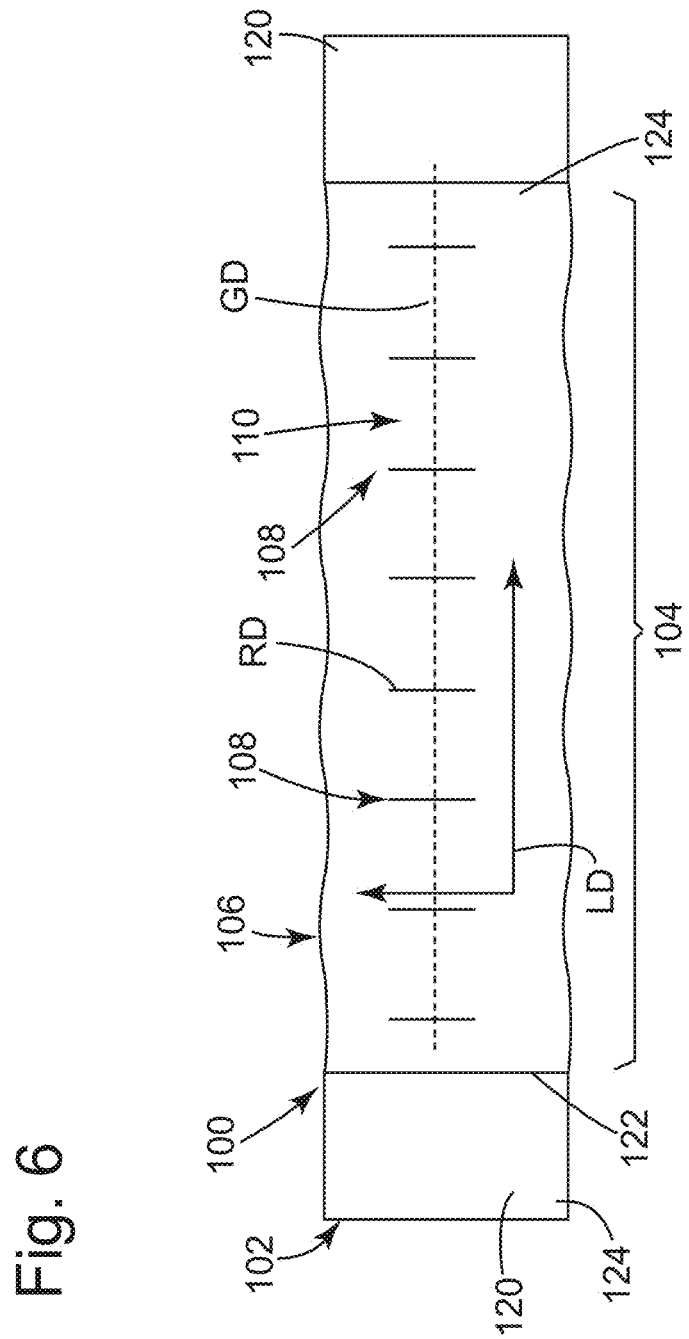
Figure 7:
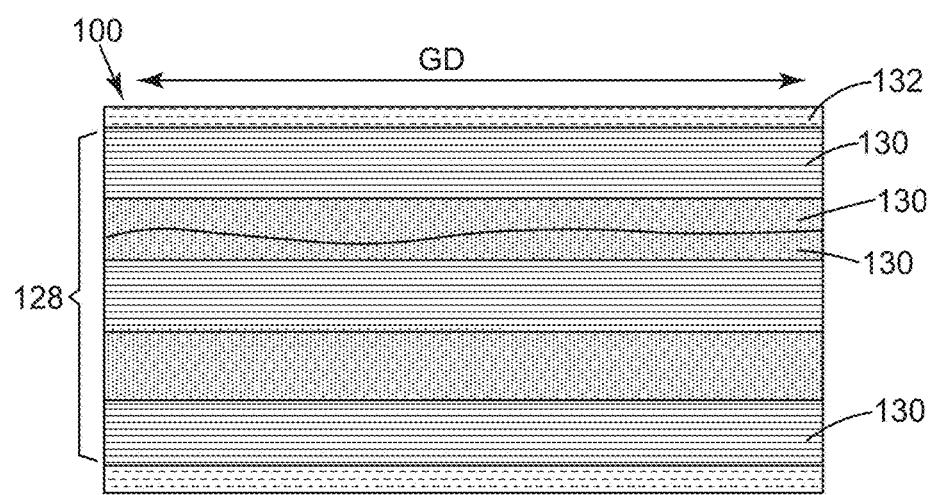
FIG. 7 shows a cross-sectional view of a body of the ripple spring according to embodiments of the invention.

A ripple spring 100 according to embodiments of the invention is illustrated in FIGS. 4-6. FIG. 4 shows a cross-sectional view, and FIGS. 5 and 6 show plan views of a couple of alternative embodiments. Referring to FIG. 4, ripple spring 100 includes a body 102 including a central portion 104 having a substantially sinusoidal shaped surface 106. Substantially sinusoidal shaped portion 106 includes a number of substantially even spaced troughs or valleys 110 and ridges 108. In contrast to conventional ripple springs 50, 52, 68 (FIG. 3), ripple spring 100 includes a substantially planar end portion 120 extending from each end 122, 124 of central portion 104. Each planar end portion 120 may extend a distance configured to prevent abrasion of the ripple spring on adjacent winding bars and stator core. For example, for a ripple spring 100 that is approximately 365 to 427 centimeters (cm) (approximately 12 to 14 feet long), each end portion 120 may extend approximately 30-61 cm (approximately 1-2 inches). Other dimensions may also be possible. In addition, a wavelength of sinusoidal portion 104, i.e., distance between ridges 108, number of ridges/valleys, and amplitude A may be selected to accommodate a particular stator configuration. In one embodiment, at least 4 set of ridges and valleys are employed with each wave cycle approximately 60 cm (2.4 inches for side ripple spring) or 30 cm (1.2 inches for top ripple spring); however the number, wavelength and the amplitude of a complete wave (ridge to valley-to-adjacent ridge) can be varied depending on the application and slot clearances. In one embodiment, each substantially planar end portion 120 may include rounded edges or corners 124; however, this is not necessary in all instances. For example, when placed in the middle of the slot where the potential lateral bar movement is less likely and insignificant, the edge of planar end portions 120 may not need to be rounded.

As shown in FIG. 4, in one embodiment, substantially sinusoidal shaped surface 106 has an amplitude A extending along a first axis (length of body 102), and each substantially planar end portion 120 extends from substantially sinusoidal shaped surface 106 at approximately a mid-amplitude (A/2) location of substantially sinusoidal shaped surface 106. In this fashion, end portions 120 are spaced equidistant within amplitude A, positioning end portions 120 equidistant within a space between, for example, as shown in FIG. 3, stator core 42 and stator windings 46, 48, or stator slot filler 70 and stator wedge slides 72. As a result, end portions 120 allow compression to the conventional level of 75% or more, and allow end portion 120 to evenly touch the surface of the stator bar. Substantially planar end portions 120 act to substantially eliminate the probability of the wavy edge of a side ripple spring cutting deep into the stator bar surfaces. Consequently, it eliminates stator bar damage by a ripple spring while maintaining all retention properties of a ripple spring.

As shown in FIG. 4, body 102 may include a plurality of layers 128. Layers 128 may each include a fiberglass. For example, body 102 may include, but not limited to, a novalac epoxy-based impregnated glass semiconductive composite such that it has high heat resistance (e.g., glass transition temperature $T_g$ approximately 150-210° C.). The glass may include, for example, unidirectional electrical grade fiber glass (E-glass), carbon fiber glass, or an aluminoborosilicate glass with less than 1% w/w alkali oxides, or other conventional forms of materials. In one embodiment, layers 128 may each include a plurality of plies 130 (FIG. 7) of glass, each ply including two bundles of the glass that are substantially perpendicular to each other. For example, as shown schematically in FIG. 7, three plies are shown with three bundles of glass running across the page (top, middle and bottom) and the other three running into and out of page (other three layers). In one embodiment, body 102 may also include a carbon fiber glass layer 132 over the epoxy-impregnated E-glass semiconductive composite. Body 102 may be molded or otherwise formed into the shape disclosed herein.

Figure 8:
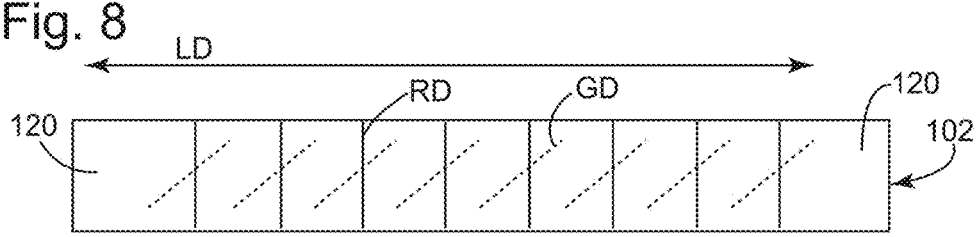
FIGS. 8-14 show plan schematic views of glass, ridges/valleys and length direction arrangements of the ripple spring according to embodiments of the invention.

The outer bundle in one ply (130 top, bottom) is arranged in a similar fashion, which indicates a glass direction GD, i.e., the direction of the fiber glass in the outer bundles of layers 128. Glass direction GD is denoted in the drawings (FIGS. 5-14) with a dashed line overlying the structure. In FIGS. 5, 6 and 8, body 102 is indicated as extending in a length direction LD. Also, shown in FIGS. 5, 6 and 8 by solid lines overlying the structure, substantially sinusoidal shaped surface includes a plurality of ridges 108 (FIG. 4) and valleys 110 (FIG. 4) extending in a ridge/valley direction RD. The solid line for ridge direction RD and dashed line for glass direction GD arrangement is carried through alternative embodiments illustrated schematically in FIGS. 9-14. In those figures, the body's length direction extends across the page.

FIGS. 5 and 6 show two embodiments of ridge direction RD versus glass direction GD and length direction LD, and FIGS. 8-14 show similar or alternative embodiments.

Figure 11:
Figure 12:
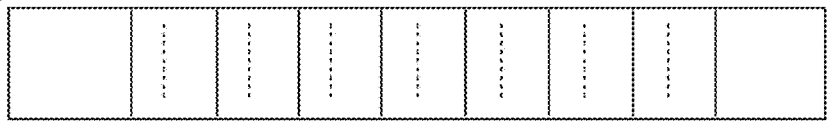

In FIGS. 6, 8, 11 and 12, the length direction LD (length of body 102) and ridge direction RD (solid lines) are substantially perpendicular. In FIG. 6, glass direction GD (dashed line, only one line shown for clarity) is angled substantially parallel to length direction LD. In FIGS. 8 and 11, glass direction GD (dashed line) is angled other than substantially perpendicular or substantially parallel to ridge direction RD (solid line), e.g., between plus or minus approximately 30° to 60°, and preferably approximately +/−45°. In FIG. 12, glass direction GD is substantially parallel to ridge direction RD.

Figure 9:
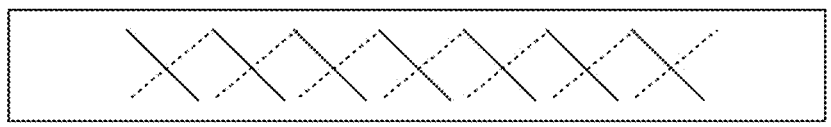
Figure 10:
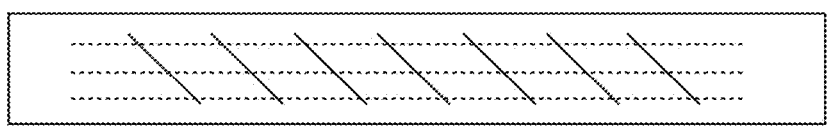
Figure 13:
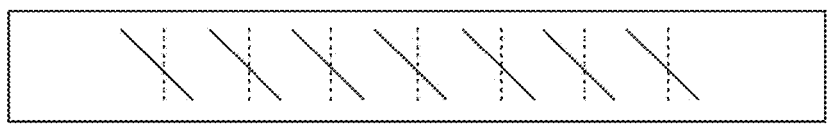
Figure 14:
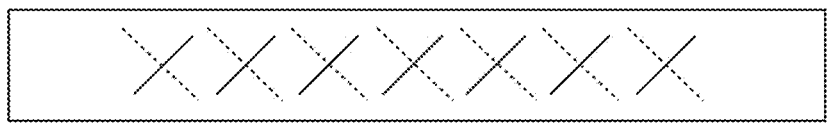

In FIGS. 5, 9, 10, 13 and 14, ripple direction RD (solid lines) is angled other than substantially perpendicular to length direction LD, e.g., between plus or minus (+/−) approximately 30° to 60°, and preferably approximately +/−45°. In FIG. 13, glass direction GD (dashed lines) is angled substantially perpendicular to length direction LD. In FIG. 10, glass direction GD (dashed line) is substantially parallel to the length direction LD. In FIGS. 5, 9 and 14, glass direction GD (dashed line) is also angled other than substantially perpendicular or substantially parallel to length direction LD, e.g., between plus or minus (+/−) approximately 30° to 60°, and preferably approximately +/−45°. FIGS. 5 and 9 are essentially the same embodiment.

Turning to FIG. 15, in an alternative embodiment, a sacrificial wear plate 140 may extend along body 102 to provide further resistance against wear of ripple spring 100. An individual sacrificial wear plate 140, which has the same length as an individual ripple spring, may be made of the same material as ripple spring 100. Sacrificial wear plate 140 may be integral with body 102, e.g., may be attached or adhered to or molded to ripple spring 100. In another embodiment, shown in FIG. 16, each substantially planar end portion 120 extending from substantially sinusoidal shaped surface 106 does not have to be contoured at approximately a mid-amplitude location of the substantially sinusoidal shaped surface for fitting into a convenient molding process.

Ripple spring 100 as described herein is typically used as a side ripple spring (e.g., to replace ripple springs 50, 52 in FIG. 3). However, the structure may also be applied to a top ripple spring (e.g., 68 in FIG. 3) with dimensional change and removal of a semiconductive property.

Referring to FIGS. 3-6, a ripple spring 100 according to embodiments of the invention may be used in combination with an electric machine 10 (FIG. 1) having a rotor and a stator. As described relative to FIG. 3, stator may have a stator core 42 with a plurality of stator slots 44, and a plurality of stator bars 46, 48, contained substantially within the plurality of stator slots 44. Ripple spring 100 may be located between at least one of the plurality of stator bars 46, 48 and stator core 42. The ripple spring may be applied densely near the end of the slot along the length of the stator bar and more sparsely in the middle of the slot where conventional ripple springs may be also applied in combination owning to the strong lateral movement force near the slot exit.

Figure 17:
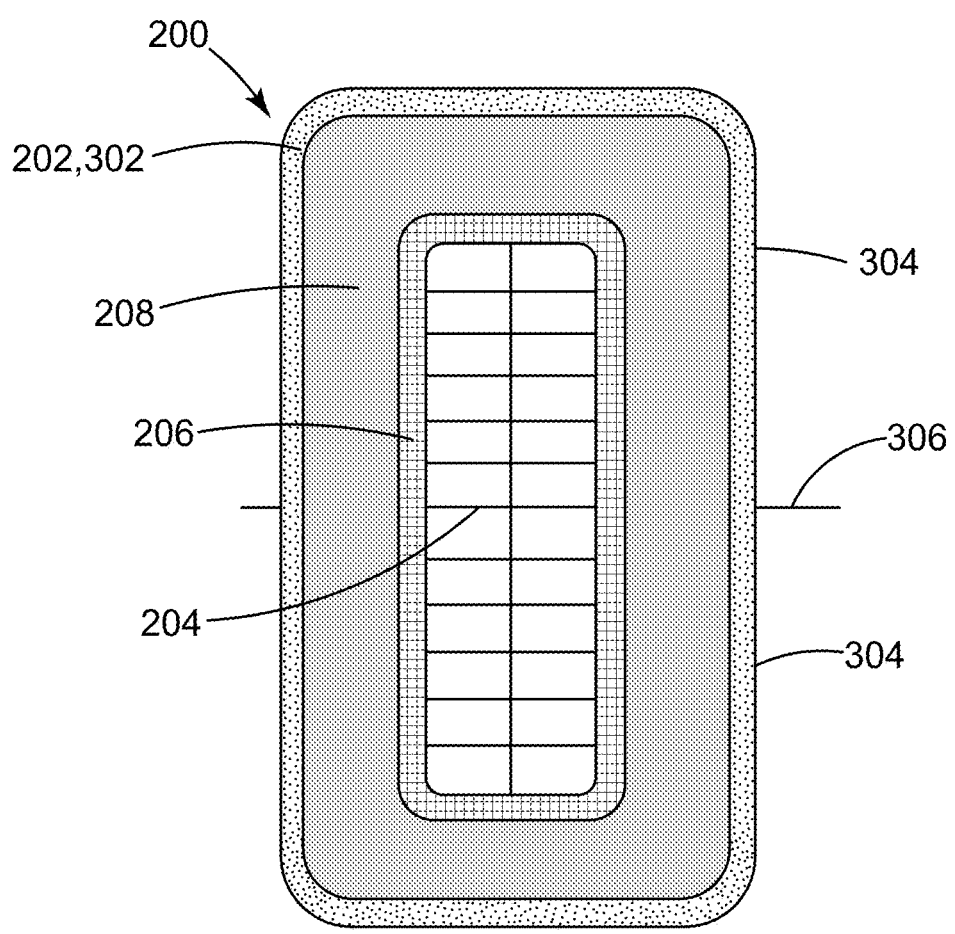
FIG. 17 shows a cross-sectional view of a stator bar including a pack armor layer according to embodiments of the invention.

Referring to FIG. 17, in another embodiment of the invention, a stator bar 200 is provided with an armor layer 202 that provides increased abrasion resistance compared to conventional systems. Stator bar 200 includes a stator bar core 204 of, for example, insulated Roebel copper strand package or other appropriate material. A semiconductive layer 206 is provided about stator bar core 204. Semiconductive layer 206, which may be referred to as an internal grating layer, may include, for example, electrical grade glass tape impregnated with thermoplastic resin whose resistivity may not be less than 10,000 ohms per square. An insulation layer 208 may be provided, e.g., wound over semiconductive layer 206. Insulation layer 208 may include, for example, a high heat resistant epoxy resin impregnated mica tape whose glass transition temperature is at least 120° C., and preferably at least higher than 135° C. when properly cured and compacted. A semiconductive armor layer 202 is provided about insulation layer 208 and includes, in contrast to conventional systems, a high heat resistant novolac epoxy resin impregnated glass composite. The taped stator bar is then cured in a method known to those skilled in the art using a time-temperature profile that is sufficient to cure the entire stator bar insulation system to their optimal degree of cure, measured by glass (or softening) transition temperature. Through the use of the high heat resistant and harder novalac epoxy resin impregnated glass composite, armor layer 202 has a shore D hardness greater than approximately 92, which may be sufficient to resist ripple spring abrasion thereof and is harder than conventional armor layers which are made with relatively low heat resistant epoxy impregnated glass tape whose glass transition temperature may be below 90° C. or even below 70° C. In addition, the material composition increases armor layer 202 heat resistance, e.g., increased glass transition temperature above or close to temperature of stator bar core 204 (e.g., typical generator operating temperature is approximately 110-135° C.), or close to that of a ripple spring. The composition of such a novolac epoxy varnish may be a combination of two or three epoxies based upon epoxidized novolac resin from Dow Chemicals, and liquid bis-phenol A epoxy from Momentive. The small amount of organic solvents such as toluene, MEK, acetone, may be present to facilitate the armor tape-making but solvent residue may be negligible after the armor tape is made for taping the stator bar. The crosslinking and catalyst package may include those with a hydroxyl-containing compound with laden catalyst aluminum acetoacetate. Consequently, wear on the stator bar surface may be significantly reduced under operating conditions. Once in position, as shown in FIG. 3, stator bar 200 would be adjacent ripple spring 100.

In another embodiment, an abrasion resistant ingredient such as silicone additive may be added into the composition of the resin varnish that makes armor layer 202 to reduce its surface coefficient of friction to a level that reduces the abrasion but not cause vibration or ripple spring migration out of the slot.

In another embodiment, shown in FIG. 17, an armor layer 302 may be provided about insulator layer 208 in which armor layer 302 includes flexible electrically semiconductive ceramic substantially U-shaped tubing or member 304 (split shown by extended line 306) that is configured to conform to a surface of the insulator layer and corners of a stator bar. Two members 304 would be placed about each stator bar to form an entire layer. Armor layer 302 may be made of flexible substantially U-shaped tubing that is configured to conform to a surface of insulator layer 208. In this embodiment, armor layer 302 may include an electrically semiconductive and high thermal conductive "flexible ceramic tubing" (such as an aluminum oxide-based composition and its combination that makes it flexible) which conforms the insulator layer shape so that when the thin but flexible ceramic armored bar is applied into the slot (after compounding tank cure), the bar insulation system is well protected from all kinds of abrasion. This U-shaped ceramic armor layer 302 may be an integral part of insulation layer 208, or it may be a separate kit and applied during the stator bar insertion process. Although shown as completing about insulation layer 208, U-shaped ceramic armor layer may extend only partially about insulation layer 208, e.g., within only one U-shaped member with an open upper end. The added thickness of this thin conforming U-shaped tubing may leave the slot clearance large enough to accommodate the side ripple spring when compressed between the stator bar and stator core in the slot. The length of the U-shape ceramic tubing does not have to be the same length of the entire slot. The length of the ceramic tubing may be one or two side ripple spring's length, and placed near both ends of a slot where the lateral movement of a stator bar may be strong.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A ripple spring comprising:
a body including a central portion having a substantially sinusoidal shaped surface and a substantially planar end portion extending from each end of the central portion, wherein the substantially sinusoidal shaped surface has an amplitude extending along a first axis, and each substantially planar end portion extends from the substantially sinusoidal shaped surface at approximately a mid-amplitude location of the substantially sinusoidal shaped surface.

2. The ripple spring of claim 1,
wherein the body includes a plurality of layers including a fiber glass arranged in a glass direction,
wherein the body extends in a length direction, and
wherein the substantially sinusoidal shaped surface includes a plurality of ridges and valleys extending in a ridge direction.

3. The ripple spring of claim 2, wherein the length direction and the ridge direction are substantially perpendicular.

4. The ripple spring of claim 3, wherein the glass direction is substantially parallel to the ridge direction.

5. The ripple spring of claim 3, wherein the glass direction is angled other than substantially perpendicular or substantially parallel to the ridge direction.

6. The ripple spring of claim 3, wherein the glass direction is angled substantially parallel to the length direction.

7. The ripple spring of claim 2, wherein the ridge direction is angled other than substantially perpendicular to the length direction.

8. The ripple spring of claim 7, wherein the glass direction is angled other than substantially perpendicular or substantially parallel to the length direction.

9. The ripple spring of claim 7, wherein the glass direction is angled substantially perpendicular to the length direction.

10. The ripple spring of claim 7, wherein the glass direction is substantially parallel to the length direction.

11. The ripple spring of claim 2, wherein the plurality of layers includes a plurality of plies of glass, each ply including at least two bundles of glass that are substantially perpendicular to each other.

12. The ripple spring of claim 1, wherein each substantially planar end portion includes rounded edges.

13. The ripple spring of claim 1, wherein the body includes novalac epoxy-impregnated E-glass semiconductive composite, and further comprising a carbon fiber glass layer over the epoxy-impregnated E-glass semiconductive composite.

14. The ripple spring of claim 1, further comprising a sacrificial wear plate extending along and integrally coupled to the body.

15. The ripple spring of claim 1, wherein the ripple spring is a side ripple spring.

16. The ripple spring of claim 1, further in combination with: an electric machine having a rotor and a stator, the stator having a stator core with a plurality of stator slots; a plurality of stator bars contained substantially within the plurality of stator slots; and wherein the ripple spring is located between at least one of the plurality of stator bars and the stator core.

17. The ripple spring of claim 16, further comprising an armor layer over at least one of the plurality of stator bars, the armor layer including a novalac epoxy resin impregnated glass composite.

18. The ripple spring of claim 17, wherein the armor layer has a shore D hardness greater than approximately 92.

* * * * *